E. J. ARMSTRONG.
AXLE JOINT.
APPLICATION FILED JAN. 20, 1915.

1,162,204.

Patented Nov. 30, 1915.

UNITED STATES PATENT OFFICE.

EDWIN J. ARMSTRONG, OF ERIE, PENNSYLVANIA, ASSIGNOR TO BALL ENGINE COMPANY, OF ERIE, PENNSYLVANIA, A CORPORATION OF PENNSYLVANIA.

AXLE-JOINT.

1,162,204.  Specification of Letters Patent.  Patented Nov. 30, 1915.

Application filed January 20, 1915. Serial No. 3,367.

*To all whom it may concern:*

Be it known that I, EDWIN J. ARMSTRONG, a citizen of the United States, residing at Erie, in the county of Erie and State of Pennsylvania, have invented new and useful Improvements in Axle-Joints, of which the following is a specification.

This invention relates to axle joints and consists in certain improvements in the construction thereof as will be hereinafter fully described and pointed out in the claim.

Axle joints of various types are subjected to great strains and by reason of this it is usual to form such joints with a yoke having the arms extend each side of the companion member. Where this is done it is either necessary to machine the surfaces in contact in the inner faces of the arms of the yoke or it is necessary to make the distance between the arms greater than will make a close joint when finished.

The object of the invention is to provide a simple means for forming such an axle joint in which the forming accurately the inner surface of the arms a pre-determined distance apart is obviated.

Figure 1:
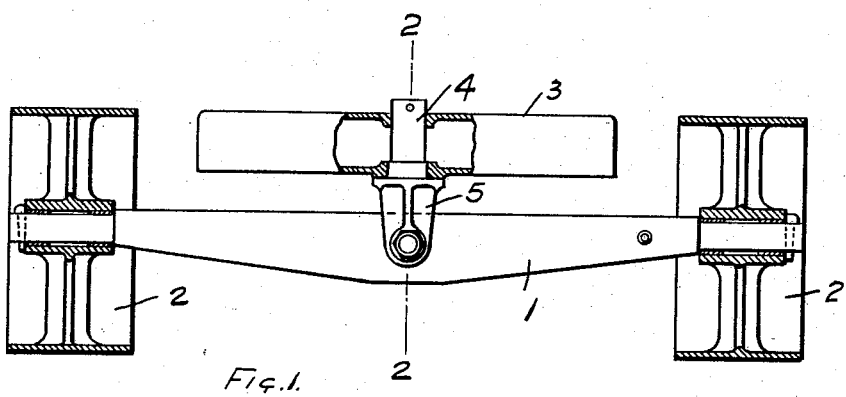
Figure 2:
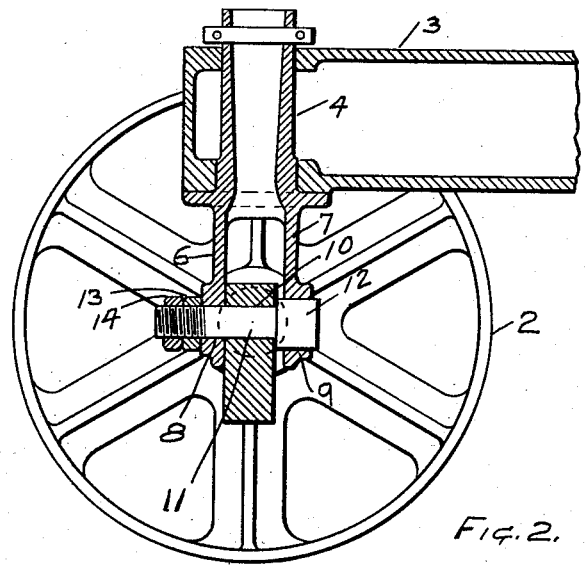

In the drawings, Figure 1 is an elevation of the device certain parts being in section; and Fig. 2 is a section on line 2—2 of Fig. 1.

The invention is illustrated in the accompanying drawings wherein—

1 marks the axle, 2 the wheels on the axle, 3 a platform or bolster, 4 a king post and 5 a joint yoke at the bottom of the king post, the yoke having the arms 6 and 7.

The arm 6 has a perforation 8 and the arm 7 the perforation 9, the perforation 9 being somewhat larger than the perforation 8. The axle 1 has a perforation 10 preferably of the same size as the perforation 8. The bolt 11 is passed through the perforations 10 and 8 and is secured by the nut 13. The nut 13 is locked in adjustment by the jam nut 14. The head 12 of the bolt is of such size as to pass into or through the perforation 9 against the axle. Preferably it is so shaped and of such a size as to form a joint in the perforation 9.

With this construction a joint may be formed by means of which the axle may be held in contact with one of the arms of the yoke. This is done by drawing up the bolt 11 by means of the nut 13 until the axle is just in contact but free to move in the joint. The head 12 makes a complete support for the head end of the bolt. It will be readily seen that the inner surfaces of the arms 6 and 7 do not require machining or finishing to make a close fit with the axle yet a perfectly tight joint may be secured.

What I claim as new is:—

In an axle joint, the combination of the axle; a king post having a yoke in its lower end, the axle being placed intermediate the arms of the yoke, said arms and the axle having registering perforations, the perforation in one arm being larger than the perforation in the axle; a bolt having its head disposed in the larger perforation and against the axle, said bolt extending through the perforation in the axle and into the perforation in the other arm of the yoke; and means for securing the bolt in place.

In testimony whereof I have hereunto set my hand in the presence of two subscribing witnesses.

EDWIN J. ARMSTRONG.

Witnesses:
V. C. HESS,
B. M. HARTMAN.

Copies of this patent may be obtained for five cents each, by addressing the "Commissioner of Patents, Washington, D. C."